(12) United States Patent
Walker

(10) Patent No.: US 9,487,121 B2
(45) Date of Patent: Nov. 8, 2016

(54) SYSTEM FOR SECURING CONTAINERS WITH COMPRESSIVE AND TORSIONAL ACTUATING UNIT

(71) Applicant: Staffa IPI, LLC, Westport, CT (US)

(72) Inventor: Peter J. Walker, Wesport, CT (US)

(73) Assignee: Staffa IPI, LLC, Westport, CT (US)

( * ) Notice: Subject to any disclaimer, the term of this patent is extended or adjusted under 35 U.S.C. 154(b) by 0 days.

(21) Appl. No.: 14/894,124

(22) PCT Filed: Jun. 6, 2014

(86) PCT No.: PCT/US2014/041232
§ 371 (c)(1),
(2) Date: Nov. 25, 2015

(87) PCT Pub. No.: WO2014/197765
PCT Pub. Date: Dec. 11, 2014

(65) Prior Publication Data
US 2016/0101933 A1   Apr. 14, 2016

Related U.S. Application Data

(60) Provisional application No. 61/831,847, filed on Jun. 6, 2013.

(51) Int. Cl.
*B60P 7/08*      (2006.01)
*B60P 7/13*      (2006.01)
*B65D 90/00*     (2006.01)

(52) U.S. Cl.
CPC .............. *B60P 7/132* (2013.01); *B60P 7/0807* (2013.01); *B65D 90/002* (2013.01); *B65D 90/0013* (2013.01)

(58) Field of Classification Search
CPC .. B60P 7/0807; B60P 7/132; B65D 90/0013; B65D 90/002
USPC ..................... 410/32, 69, 70, 76, 80, 82–84; 294/81.52, 81.53; 24/287; 248/500, 248/503
See application file for complete search history.

(56) References Cited

U.S. PATENT DOCUMENTS

| 3,980,185 | A | 9/1976 | Cain |
| 4,341,495 | A | 7/1982 | Del'Acqua |
| 7,014,234 | B2 | 3/2006 | Walker |
| 8,177,463 | B2 | 5/2012 | Walker |
| 2004/0265086 | A1* | 12/2004 | Dahlstrom .............. B60P 7/132 410/84 |
| 2011/0155614 | A1 | 6/2011 | Szeglin et al. |

* cited by examiner

*Primary Examiner* — Stephen Gordon
(74) *Attorney, Agent, or Firm* — Pepper Hamilton LLP

(57) ABSTRACT

A system for locking and unlocking containers to transport modes and other containers comprises an actuating unit in an upper corner fitting of a container, a mechanical connecting device connected to the actuating unit, and guides to route the connecting device from the actuating unit to a rotatable locking leg housed in a lower corner fitting of the container. The twistlock of a lifting spreader engages the upper corner fitting of a container, urging the actuating unit. The connecting device is in turn urged, thereby causing the locking leg to rotate.

21 Claims, 11 Drawing Sheets

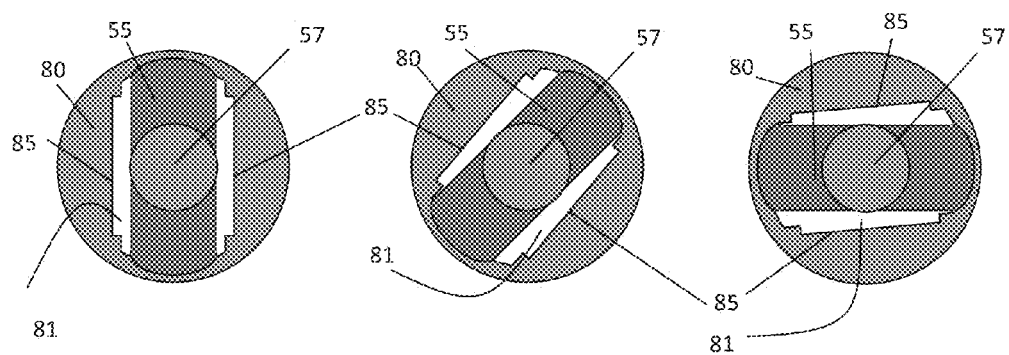
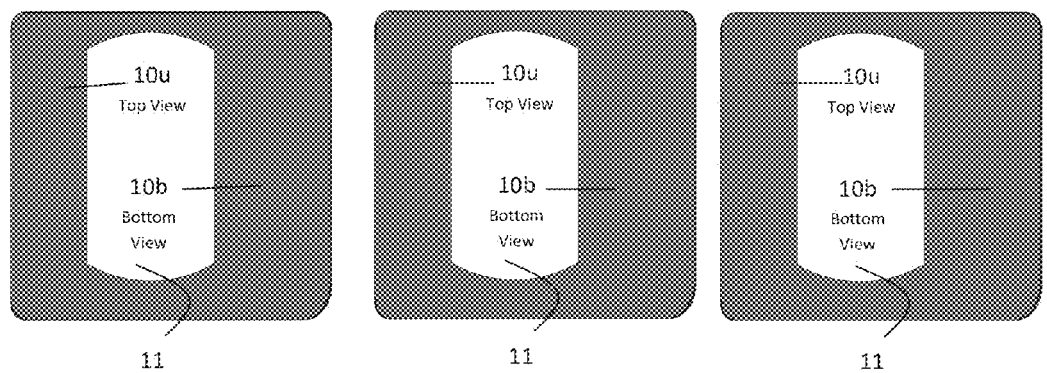
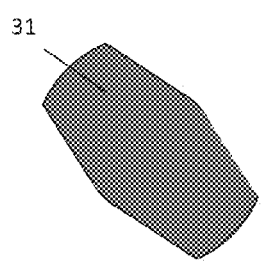
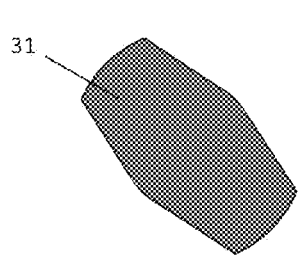
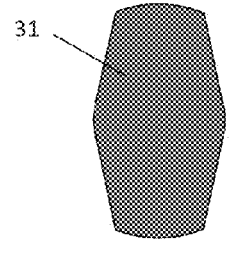
FIG. 2A              FIG. 2B              FIG. 2C

SYSTEM FOR SECURING CONTAINERS WITH COMPRESSIVE AND TORSIONAL ACTUATING UNIT

CROSS-REFERENCE TO RELATED APPLICATIONS

This application is a U.S. national phase filing of PCT Patent Application No. PCT/US2014/041232, titled "System for Securing Containers with Compressive and Torsional Actuating Unit" and filed on Jun. 6, 2014, which claims priority to U.S. Provisional Patent Application No. 61/831, 847, titled "System for Securing Containers with Compressive and Torsional Actuating Unit" and filed on Jun. 6, 2013, the contents of which are hereby incorporated by reference in their entirety herein.

TECHNOLOGY FIELD

This disclosure relates generally to the locking of shipping containers. More particularly, this disclosure relates to a mechanism for connecting and disconnecting bulk containers to a base, such as, but not limited to, chassis, railcars, ship hatches, airline cargo decks, terminal decks and other containers.

BACKGROUND

When transporting or stacking bulk containers, a locking device is needed to secure the containers to a base. The base could be an integral part of a transport vehicle, such as: truck chassis, railcar, aircraft, or ship hatch. Additionally, a base could be an adjacent container, when the containers are stacked onboard ships, rail cars, or in container yards. These locking devices are numerous including: cones, twistlocks, lashing bars, and other systems. Although these devices and systems are currently used to connect containers to various bases, they possess a number of disadvantages that make them unsafe and inefficient.

Currently a device called a cone is used when connecting containers to a ship's hatch or other containers. Cones generally come in three forms: manual cones, automatic cones, and below deck cones. Cones are generally two tetrahedron shaped objects wherein the bases of the tetrahedrons are rectangular in shape and the bases of the tetrahedrons are base to base, such that the cones, when in an unlocked position, are in the shape of an octahedral diamond. At least one of the tetrahedrons can rotate such that the bases are no longer aligned, and when inserted between container corner castings can connect containers.

Manual cones are inserted into corner castings of a container that will connect to a ship hatch or another container. These cones are inserted into the corner castings manually when a lifting device raises the container off a chassis. The cone is inserted into the corner casting access slot of a container; and the head that is in the access slot is manually turned such that the head is locked into the corner casting. Once the cones are inserted in all four lower corner castings the container is lifted to its position on the ship and lowered onto the deck or another container where the bottom head of the cone mates with the deck or upper corner fittings of a lower container. The bottom head is then manually turned such that the head is locked into the corner casting thereby locking the container to a base.

Manual cones have a number of disadvantages. Cones require manual locking and unlocking, incurring additional labor costs and placing humans in potentially dangerous situations. Additionally, they require personnel to work both on vessels and on the ground, again increasing labor costs. Laborers are required to work around and beneath suspended containers, which weigh many tons even when empty. In addition, when cones are not inserted or turned into the locking position, they can become detached from a container causing additional problems, such as an unsecured connection between a container and a base or, when being hoisted by a lifting device, the cone can fall from the container, injuring or killing personnel. Further, a cone is one form of a number of similar locking devices used to secure containers, such that additional equipment and additional purchase and maintenance costs are incurred. Lastly, recent U.S. regulations have required that all cones used at U.S. ports be of the automatic type due to safety considerations, causing the manual cones to be unsuitable for use in the U.S.

Automatic cones are similar to manual cones in design; however, when the automatic cones are mated to a base, they lock automatically. Although automatic cones eliminate the need to manually lock containers to a base, they still require a manual release, still placing personnel into dangerous work environments. For instance, containers are often stacked five, six or even seven high on board ship hatches, requiring personnel to work at great heights. Furthermore, automatic cones have a number of the disadvantages that manual cones possess, including: requiring personnel to work both on vessels and on the ground, the cones can fall free injuring or killing personnel below, and an automatic cone is one form of a number of similar locking devices used to secure containers such that additional equipment and therefore additional purchase and maintenance costs are incurred.

The twistlock is yet another device that is used to connect containers to a chassis. Twistlocks are comprised of a locking pin and a handle. The locking pin has a shaft that runs through the bolster of a chassis, which can rotate. The locking pin also has a head which is rectangular in shape at its base and is cone shaped at its top. Bulk containers have corner castings with access slots at their top and bottom such that when the container is mounted on a chassis the head of the twistlock can mate with the access slot. The access slot is an opening in the corner casting of a container with which the pin head can mate when the pin head is in an open position but cannot mate or disconnect when the pin is in a locked position. When the locking pin mates with the corner casting, a handle connected to the shaft of the locking pin is manually turned, which in turn, twists the pin head inside of the corner casting such that the base portion of the pin head connected to the shaft is now askew in relation to the opening in the corner casting access slot, such that the container cannot be disconnected from its base.

Although twistlocks address some of the limitations of the previous devices, they also possess a number of disadvantages. Still, the system requires a person to manually open and close the twistlocks in order to connect or disconnect a container from its transport base. The manual requirement can put a person in a dangerous work environment where heavy machinery is lifting tons of equipment, thereby putting an individual at risk of injury or death.

A second disadvantage of twistlocks is the resulting procedures that are adopted to prevent personnel from having to unlock containers from their bases in dangerous environments. A common practice is to require personnel to unlock containers from a chassis as the container enters a yard to prevent them from having to do so around heavy machinery or suspended containers. This method can create a number of dangerous situations in a yard. First, the container is no longer connected to the chassis, it is merely resting on the chassis. If an accident were to occur, the container is not connected to chassis, causing an unpredictable and potentially dangerous situation. Additionally, while driving around a yard, the twistlocks often turn accidentally into the locked position requiring the driver to exit the safety of his vehicle to reopen the twistlock, thereby defeating the goal of the procedure. It is not uncommon for lifting devices, such as top picks and cranes, to drag or lift the truck along with the container. These are dangerous situations for drivers and anyone else that might be in the area. A third disadvantage is that a twistlock is again one form of a number of similar locking devices used to secure containers such that additional equipment and therefore additional purchase and maintenance costs are incurred.

Another disadvantage of current methods of securing containers to transport modes relates to the rail industry. When containers are stacked one or two high on rail cars, the lower container simply sits in the well of the rail car and has no means of being connected to the car. This is because there is no way to access the lower corner fittings of a container that is sitting in the well of the rail car. As a result, there is no way to manually unlock a manual or automatic cone or twistlock.

An additional disadvantage of these devises is the number of different locking devices utilized to perform a single function, connecting or disconnecting container from a base. A single, fully automatic device should be used to connect containers to chassis, railcars, ship hatches or other containers to improve safety and efficiency between different transport modes.

Another disadvantage of these devices is that they adversely affect crane cycle times by 15 to 20% during vessel loading and discharging operations.

Inventions have been developed to overcome the above mentioned problems including Del Aqua's in 1982 (U.S. Pat. No. 4,341,495) and Cain's in 1976 (U.S. Pat. No. 3,980,185) These forms however were not commercially viable; because the components of the inventions are intrusive into the interior space of a container, susceptible to being damaged by equipment or cargo moving into and out of containers, and would require modifications to the doors of a container. Also, these inventions require all four upper corner castings of a container to be engaged by rotatable twistlocks of a spreader which is not possible when using machines which only engage two of the upper corner castings or at sites that use fork lifts to lift containers. Lastly, the number of moving parts that comprise these forms would be difficult and expensive to maintain in a fleet of containers spread around the world.

In other inventions by Walker, in 2002 (U.S. Pat. No. 7,014,234) and 2009 (U.S. patent application Ser. No. 12/383,302), the disadvantages of Del Aqua's and Cain's are overcome, however these forms also have disadvantages. One problem is caused by the non-standardized geometry of spreader and container securing twistlocks used to hoist and or connect containers together on ships. Another problem relates to the non-standardized depth penetration of spreader twistlocks housings as they enter a containers corner fitting to hoist it.

It is common practice in container yards to simply stack containers in piles without securing them to one another, because it is not required by federal or state safety regulations. Additionally, equipment costs are prohibitive; cones are provided by vessels, not stevedoring companies or container yards. The additional labor required to set, lock and unlock connecting devices is also costly.

There are hazards inherent by not connecting the containers together while in a stacked configuration, such as building a disorderly pile. While one container is being added to a stack of containers, the container being stacked may nudge another container in the stack, causing it to fall. The fallen container may not be obvious to the operator of the lifting device. For obvious reasons, this is an extremely undesirable and dangerous situation, potentially causing great damage and injury.

As can be seen by existing solution attempts, the problem of providing a safe, economical, universal, and automatic means to secure containers has not been fully addressed. Existing methods can require placing humans in dangerous situations, require many costly parts, require manual locking and unlocking, and create disorderly piles.

What is needed is a locking device that can safely, securely, automatically, and quickly lock and unlock a container from a base, requiring a minimum of direct human manipulation. What is also needed is a locking device that has no detached parts, eliminating safety concerns that arise from the detached parts. What is additionally needed is a locking device that meets current safety standards and regulations. What is further needed, is a locking device that can be engaged on rail cars. What is again further needed is a locking device that does not excessively protrude into the interior cargo space of a container. What is also needed is a locking device that can be applied to existing modified containers, without the need to modify supporting equipment. What is again needed is locking device with an actuating unit that can interface with spreader twistlocks with varied geometries. What is further needed is a locking device with an actuating unit that does not interfere with spreader twistlock housings as the spreader twistlock locks to a container. What is finally needed is a locking device that provides a means to stack container in orderly and stable piles.

OBJECTS OF THE INVENTION

It is a general object of the present invention to provide a container locking device that can safely, securely, automatically, and quickly lock and unlock a container from a base, requiring a minimum of direct human manipulation.

It is another object of the present invention to provide a container locking device that is integrated into existing container structure.

It is yet another object of the present invention to provide a container locking device that meets or exceeds current safety standards and regulations.

It is a further object of the present invention to provide a container locking device that can be engaged on ship decks, ship holds, rail cars, airplane cargo decks, truck chassis, other containers, and any number of other container transportation means.

It is yet a further object of the present invention to provide a container locking device that does not excessively protrude into the interior cargo space of a container.

It is a further object of the present invention to provide a container locking device that can be applied to existing containers, without the need to modify supporting equipment.

It is also an object of the present invention to co-exist with current container securing equipment in the field.

It is another object of the present invention to provide a container locking device with an actuating unit that can interface with a wide range of twistlock geometries.

It is still another object of the present invention to provide a locking device with an actuating unit that does not interfere with the twistlock housing of a spreader bar.

It is yet a further object of the present invention to provide a container locking device that provides a means to stack containers in orderly and stable piles.

It is another object of the present invention to provide a container securing system wherein rotation in the actuating unit and locking unit can be a 1 to 1 ratio, or something other than a 1 to 1 ratio (e.g., in embodiments where components of the actuating unit and locking unit may have different sizes or dimensions).

It is yet a further object of the present invention to reduce the use of grease lubricants compared to current products.

It is still another object of the present invention provide a tight fitting locking mechanism in the lower corner fittings while allowing for necessary clearances in upper corner fittings.

It is another object of the present invention to eliminate intermediate plates necessary on current designs.

It is still another object of the present invention to provide a clamping mechanism to allow a container securing unit to be tightly connected to the container.

Other objects and features of advantages will become apparent as the specification progresses and from the claims.

SUMMARY

In accordance with the present disclosure, a system for locking and unlocking containers to transport modes and other containers is provided. Embodiments include at least one actuating unit housed in an upper corner fitting of a container, a rotatable locking leg housed in a lower corner fitting of the container, and a means to couple the actuating unit and the locking leg. A twistlock of a lifting spreader engages the upper corner fitting of the container and therefore the actuating unit, and urges the actuating unit in the upper corner fitting. The coupling means is pulled by the urging of the actuating unit, accordingly pulling the locking leg, causing it to rotate to an unlocked position. This corner fitting assembly can be installed on either one or all four corners of the container. The assembly can also be installed between upper and lower corner fittings on containers that have corner fittings between the ends of the containers such as but not limited to 45, 48, and 53 containers.

In another embodiment, horizontal coupling means couple the lower corner fittings together, so that if a single actuating unit is engaged by a lifting spreader twistlock, multiple locking legs in the lower corner fittings can simultaneously rotate into the unlocked position. At least one of the horizontal coupling means can intersect a tine well. The tension to the coupling means can either be imparted from the actuating unit located in the upper corner fitting, causing one or multiple locking legs to rotate to the unlocked position. Alternatively, if the tine of a fork lift or similar lifting vehicle is inserted into the tine well of the container, the tine will lift the horizontal coupling means intersecting the tine well, tensioning the coupling means, again causing one or multiple locking legs to rotate to the unlocked position.

In addition, the locking leg can be of many shapes and may be comprised of a single unit or multiple parts so long as the leg stays with the lower corner fitting when lifted by a lifting device, able to withstand the forces, dictated by international standards, to secure a container to its base and is able to mate with and rotate within bases such that when the locking leg is in a locked position the locking leg and access slot of the base are not aligned and therefore cannot separate.

The lower corner fitting can be a single unit or comprised of multiple parts as described in the drawings and text of this application, providing the lower corner fitting can house, support, and allow the locking leg to rotate.

To lock securely to a structure, the locking legs need to engage a base. A base is a vertically directed access slot in a surface such that a locking leg can mate with, rotate in, and lock to the underside of the access slot. For example, a square tube with access slots embedded into the surface of a container yard or access slots in the cargo deck of an aircraft could be a base. Additionally, access slots embedded in chassis or railcars can also be a base.

An alternate design is a base having slotted vertical access openings on both the ceiling and floor of the base such that the base can be used as an adapter to receive and lock to the male locking legs of the present invention and the twistlock devices currently used to lock containers to transport modes such as, but not limited to, chassis.

An additional advantage of embodiments of the present disclosure is that a single device will be used to connect containers to bases. This will decrease the purchase and maintenance costs connected to cones and chassis twistlocks; again decreasing costs to the transportation industry.

All of the disadvantages of the prior art have been addressed by embodiments disclosed herein. As can be seen in the description, an automatic locking system for cargo containers that requires a minimum of direct human intervention is provided. No personnel is required to directly contact the container at any point during the loading and unloading process, saving both labor and time and reducing exposure to potentially unsafe situations. Additionally, no loose parts are required, reducing the chance of falling objects that may cause injury. Embodiments provided herein also enable the industry to meet safety standards. A secondary safety related advantage of the disclosed embodiments is a decrease in the costs associated with on the job injuries that occur around container operations. These decreased costs will be realized by the transportation industry and ultimately consumers.

BRIEF DESCRIPTION OF THE DRAWINGS

FIGS. 2A-C provide top views of the spreader twistlock as it interacts with compression plates during its rotation, in addition to views of a locking leg of the container securing system in key stages of the spreader twistlock engagement process and with respect to the elongated aperture of container corner fittings.

DETAILED DESCRIPTION

Figure 1A:
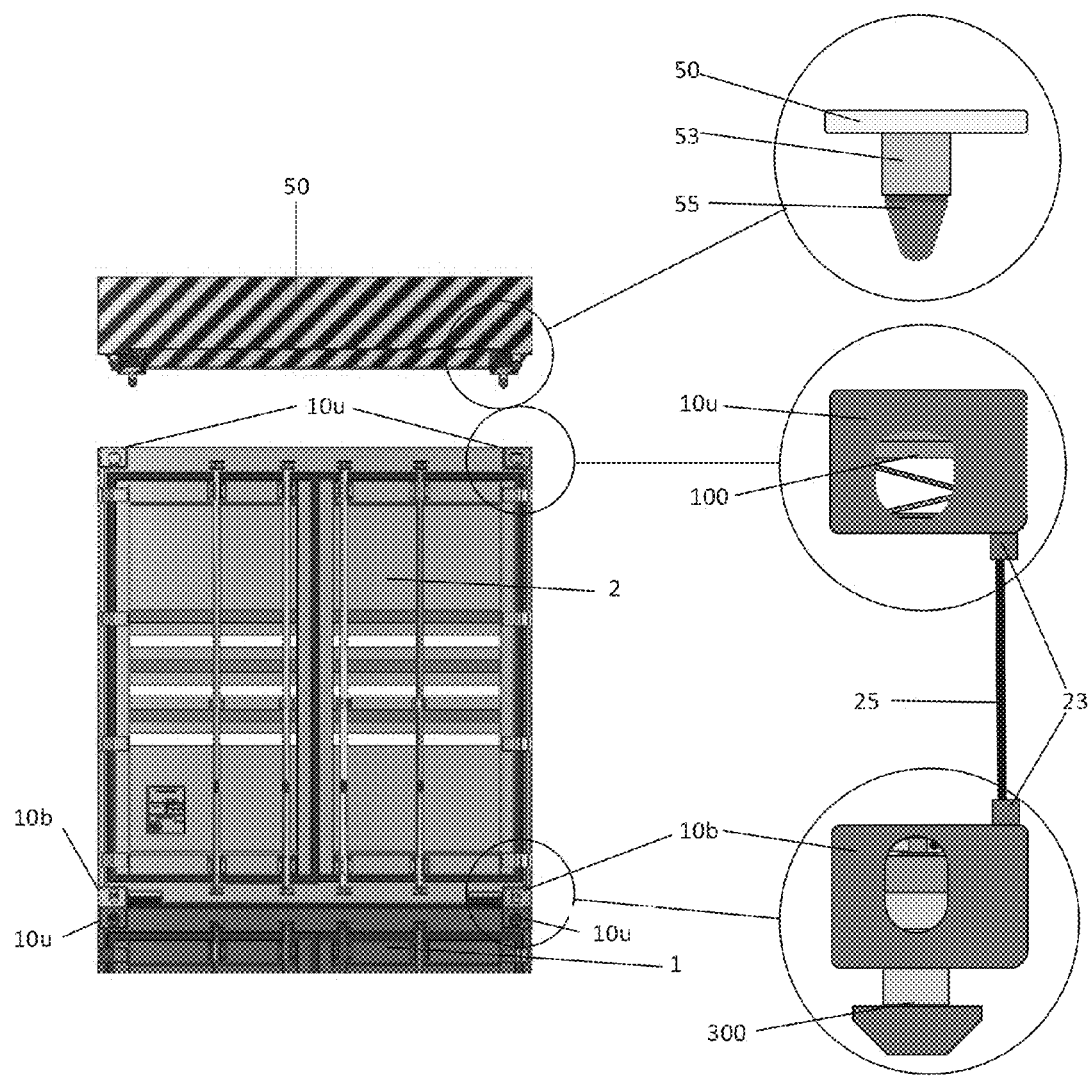
FIGS. 1A-D are operational views of one embodiment of a system for securing containers with compressive and torsional actuating units. The figures demonstrate how the container, container securing system and lifting spreader interact during lifting operations.

The detailed description set forth below in connection with the appended drawings is intended as a description of various embodiments and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

As can be seen in FIGS. 1A-D, container 1 and container 2 are stacked, one on top of the other. Each container has at least eight corner fittings, four lower corner fittings 10b and four upper corner fittings 10u, where the upper corner fittings 10u of the lower containers 1 serve as bases for the containers on top of them. The corner fittings 10u and 10b have identical elongated apertures 11 designed to receive generally rectangular shaped spreader twistlocks 55 of lifting spreaders 50 and locking legs 30 of container securing gear (see FIGS. 2A-2C). When the spreader twistlocks 55 are in alignment with the elongated apertures 11, the spreader twistlocks 55 are unlocked from the container 2; when the spreader twistlocks 55 are not in alignment with the elongated apertures 11, the spreader twistlocks 55 and therefore the spreaders 50 are locked to the container 2. The same principal applies to the locking legs 30 of container securing gear.

Returning to FIGS. 1A-D, an enlarged front view of a spreader twistlock 55 and spreader twistlock collar 53 is provided, in addition to front views of an upper corner fitting 10u having an actuating unit 100 installed in it, a lower corner fitting 10b having locking mechanism 300 installed in it, and a coupling linkage 25 connecting the actuating unit 100 to the locking mechanism 300.

Figure 1B:
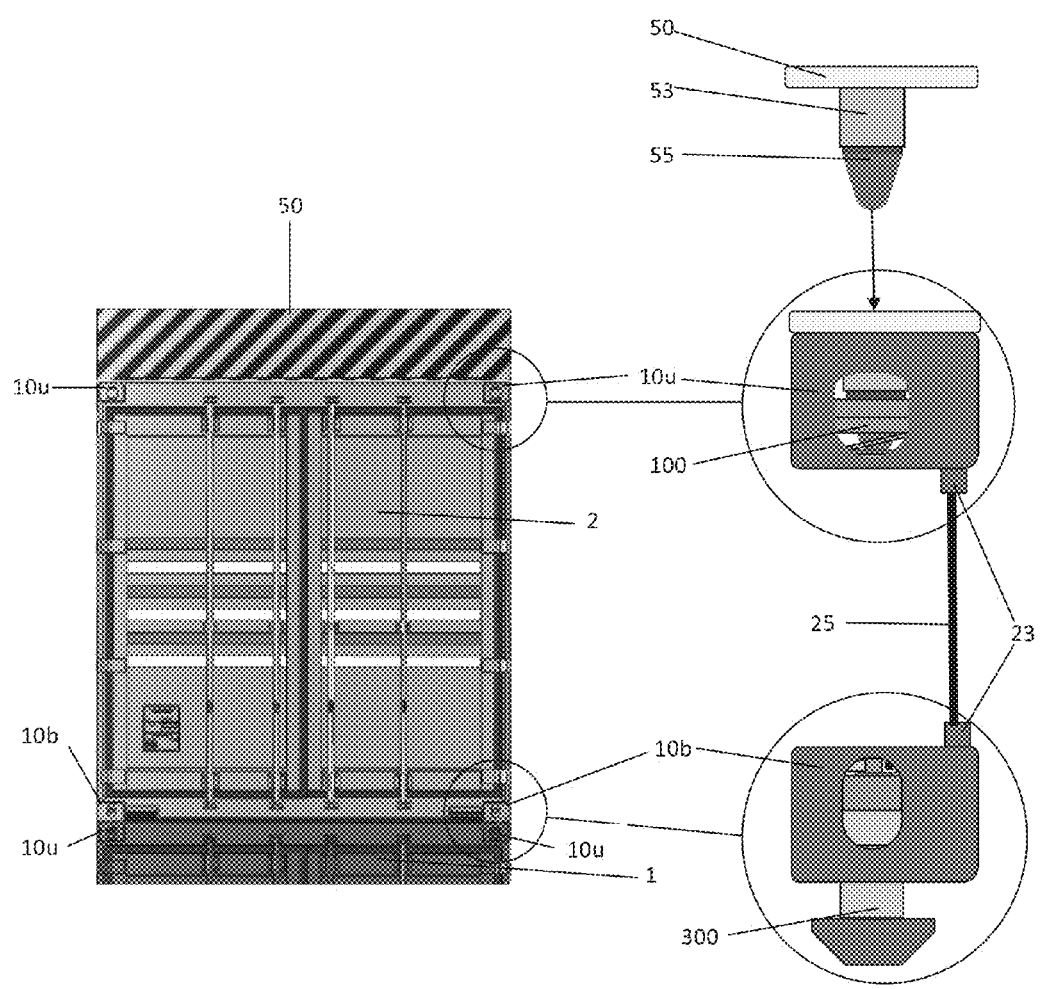

As can be seen in FIGS. 1A-B, the spreader twistlock 55 remains in the unlocked position as it initially engages the upper corner fitting 10u of container 2 prior to hoisting it. Conversely, the locking leg 30 of the locking mechanism 300 in the lower corner fitting 10b remains in the locked position. A top view of the alignment of the spreader twistlock 55 and the locking leg 30 during this phase of the container lift are provided in FIGS. 2A-B.

Figure 1C:
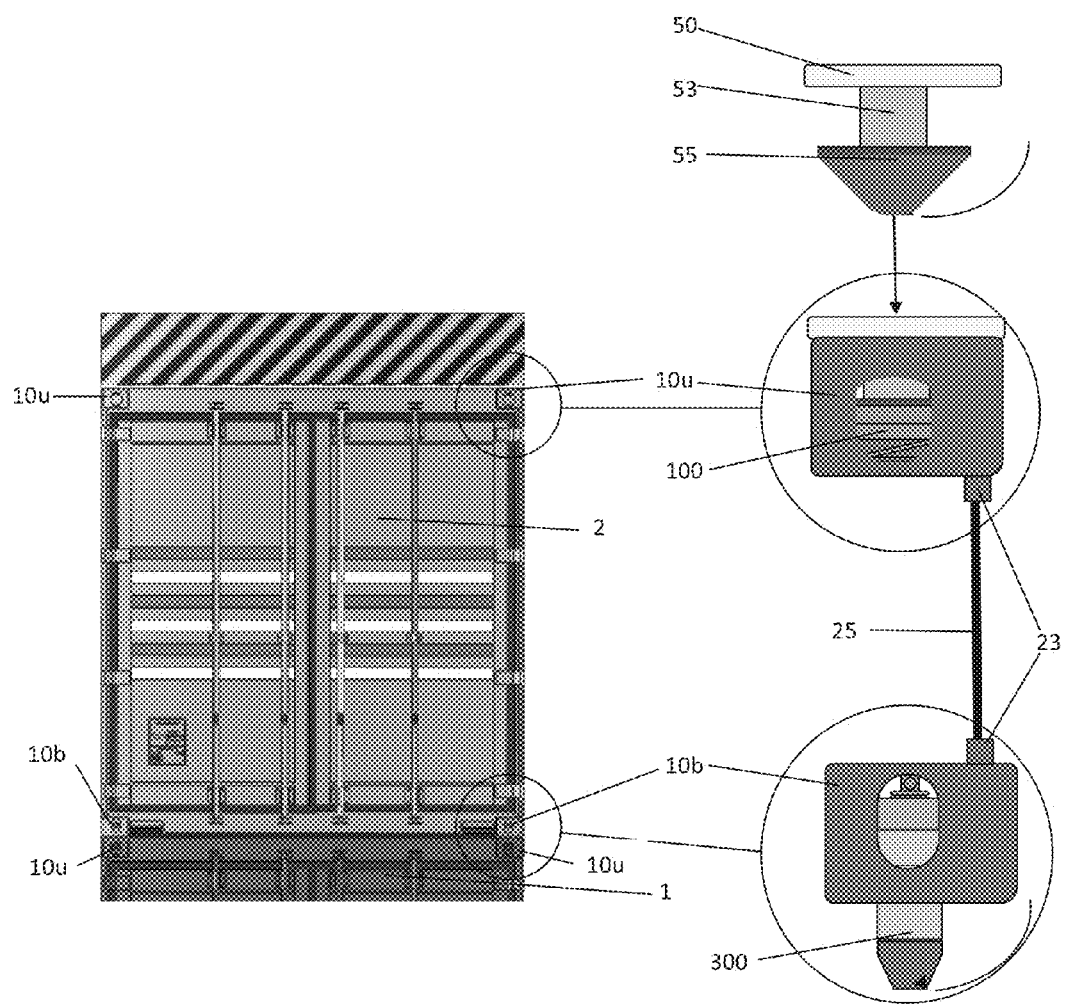
Figure 3B:
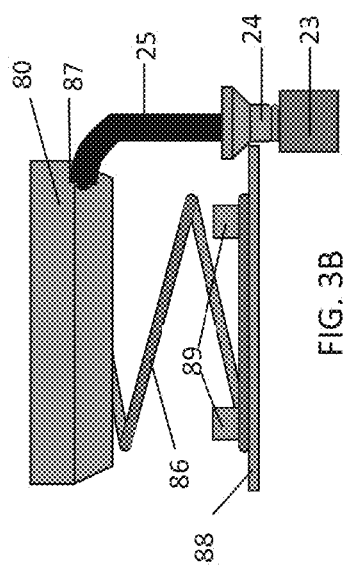
FIGS. 3A-C provide an exploded view, assembled view, and an installed view, respectively, of one embodiment of an actuating unit.
Figure 3C:
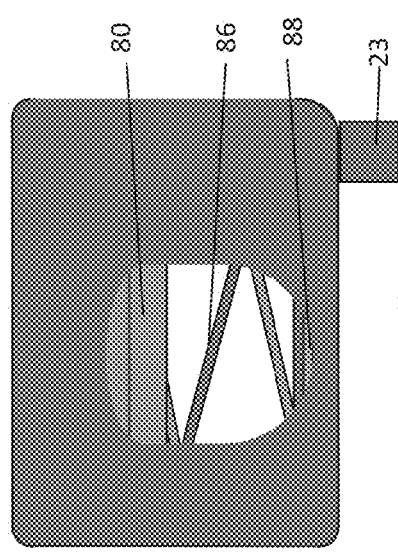
Figure 3A:
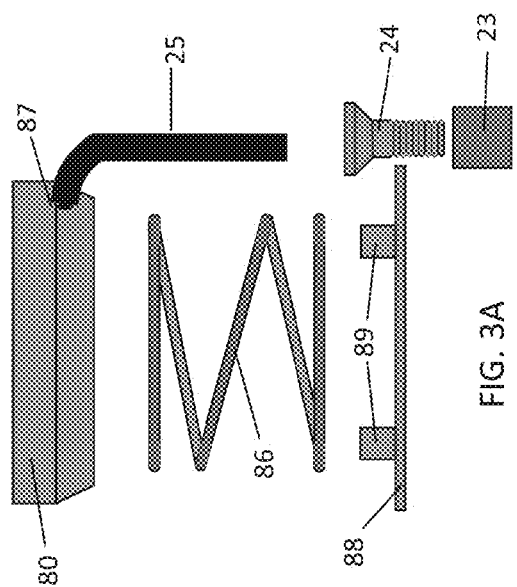

As can be seen in FIG. 1C, the spreader twistlock 55 rotates to a non-aligned position with respect to the elongated aperture 11 of the upper corner fitting 10u and is therefore locked to the container 2. FIGS. 3A-B provide exploded, assembled, and installed views, respectively, of the actuating unit 100. The compression plate 80 and vertical return means 86 components of the actuating unit 100 housed in the upper corner fitting 10u of container 2 are shown. When the spreader twistlock 55 engages the upper corner fitting 10u, it also partially nests within compression plate aperture 81 of the compression plate 80, as shown in FIGS. 2A-B, while simultaneously imparting a downward force on the compression plate 80 and vertical return means 86 as shown in FIG. 3B. This downward force allows the compression plate 80 to rotate under the spreader twistlock housing 53 as the spreader twistlock 55 rotates to a locked position within the upper corner fitting 10u as shown in FIG. 1C. According to an embodiment, the vertical return means 86 may be a compression spring, a hydraulic mechanism, an air actuator, or the like.

As the spreader twistlock 55 rotates to the locked position in the upper corner fitting, the spreader twistlock 55 communicates with the compression plate aperture walls 81 of the compression plate 80, causing the compression plate 80 to rotate with the spreader twistlock 55. This rotation can be viewed in FIGS. 2A-C.

Figure 6A:
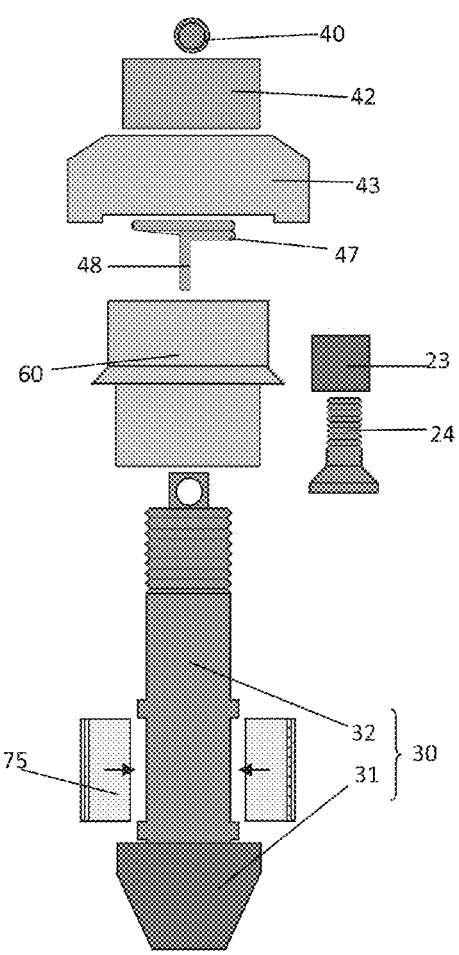
FIGS. 6A-C provide an exploded view, assembled view, and an installed view, respectively, of one embodiment of a locking mechanism.
Figure 6B:
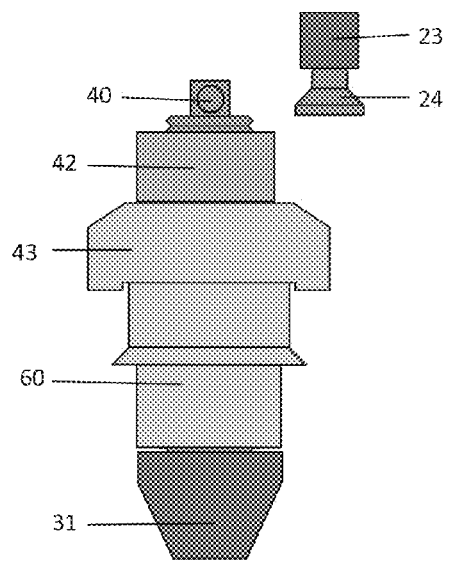

The rotation of the compression plate 80 by the twistlock spreader 55 imparts a tension force on coupling linkage 25, which passes through guiding eyes 24 in the upper corner fitting 10u and lower corner fitting 10b. One end of the coupling linkage 25 is connected to the compression plate 80 of the actuating unit 100 as shown in FIGS. 3A-C, the other end of the coupling linkage 25 is connected to a lever component 40 and locking leg 30 of the locking unit 300 as illustrated in FIGS. 6A-B. The tension imparted on the coupling linkage 25 in turn imparts a torsional force on the lever 40 and locking leg 30 causing the locking leg 30 to rotate to an unlocked position in the lower corner fitting 10b simultaneously as the spreader twistlock 55 rotates to the locked position in the upper corner fitting 10u as is shown in FIG. 1C. Container 2 can now be hoisted clear of base container 1 by the spreader 50.

Figure 1D:
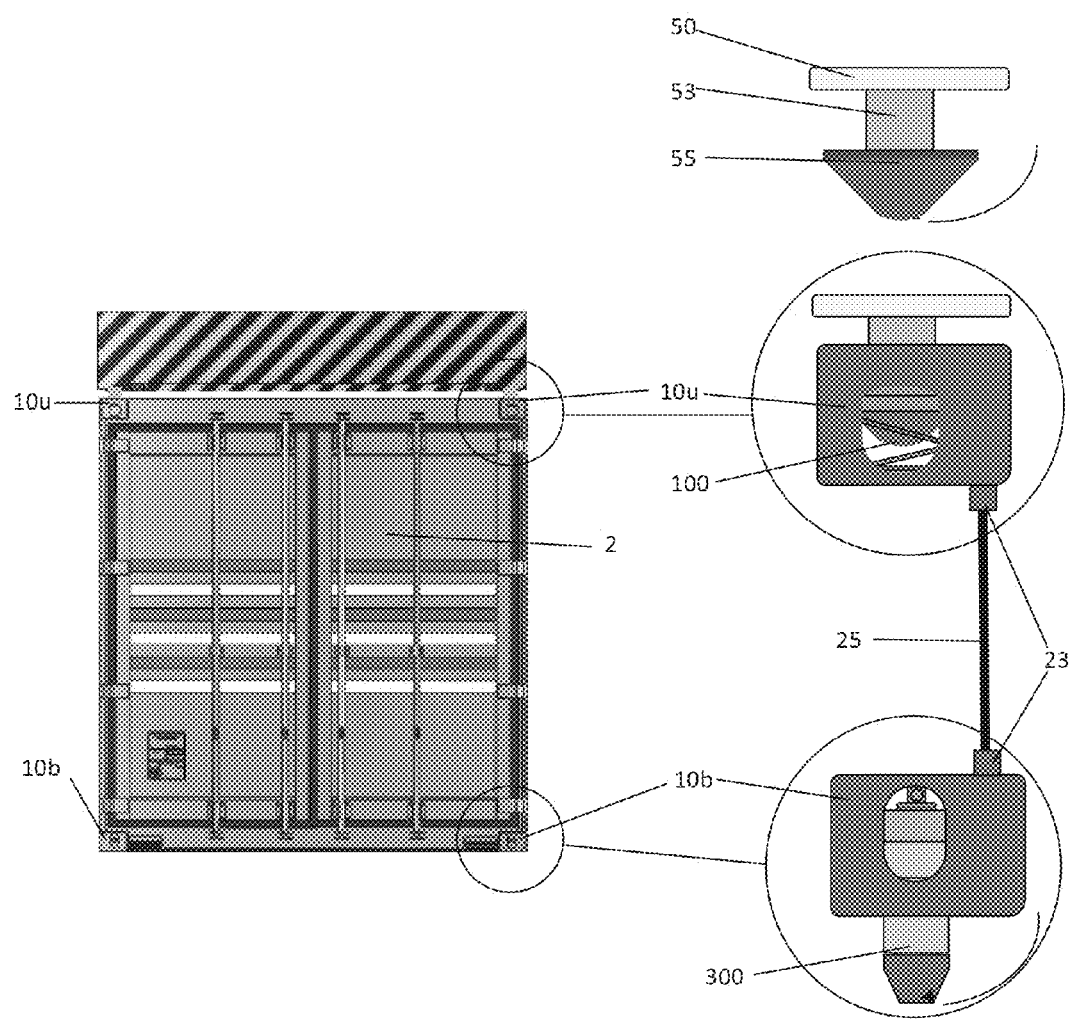

The height of the spreader twistlock collar 53 is variable depending on the spreader 50 type and manufacturer. During the hoisting of container 2, the spreader 50, spreader twistlock housing 53 and spreader twistlock will rise generally vertically a short variable distance before the spreader twistlock 50 engages the upper corner fitting 10u as shown in FIG. 1D. Simultaneously, the vertical return means 86 will impart a generally vertical force on the compression plate 80 ensuring the compression plate aperture walls 81 and spreader twistlock 55 remain in contact and the tension force keeping the locking unit 300 in the unlocked position maintained throughout the container lift.

The locking mechanism 300 contains a torsional return means 47 that communicates between the locking leg 30 and the body 60 (see FIG. 6A). When the spreader twistlock 55 rotates to the unlocked position in the upper corner fitting 10u, tension on the coupling means 25 is removed, allowing the torsional return means 47 to rotate the locking leg 30 of the locking mechanism 300 back to its natural, fully locked, state.

FIGS. 2A-C provides top views of the positions of the locking leg cone 31 in relation to the compression plate 80, spreader twistlock 55, and spreader twistlock shaft 57 during the rotation of a spreader twistlock 55. The figures also illustrate the positions of the locking leg cone 31 and spreader twistlock 55 in relation to the elongated aperture 11 on upper and lower container fittings 10u and 10b.

A vertical coupling linkage 25, having one end attached to the actuating means 100, runs through the guiding eye 24, pivoting downward and exiting the upper corner fitting 10u. The vertical coupling linkage 25 traverses the height of the container, enters the lower corner fitting 10b, pivots at a second guiding eye 24, and is attached to a locking mechanism 300. The vertical coupling linkage 25 can be any number of translational coupling devices, such as a cable or a rigid coupler utilizing a mechanism other than the guiding eye 24.

Figure 5:
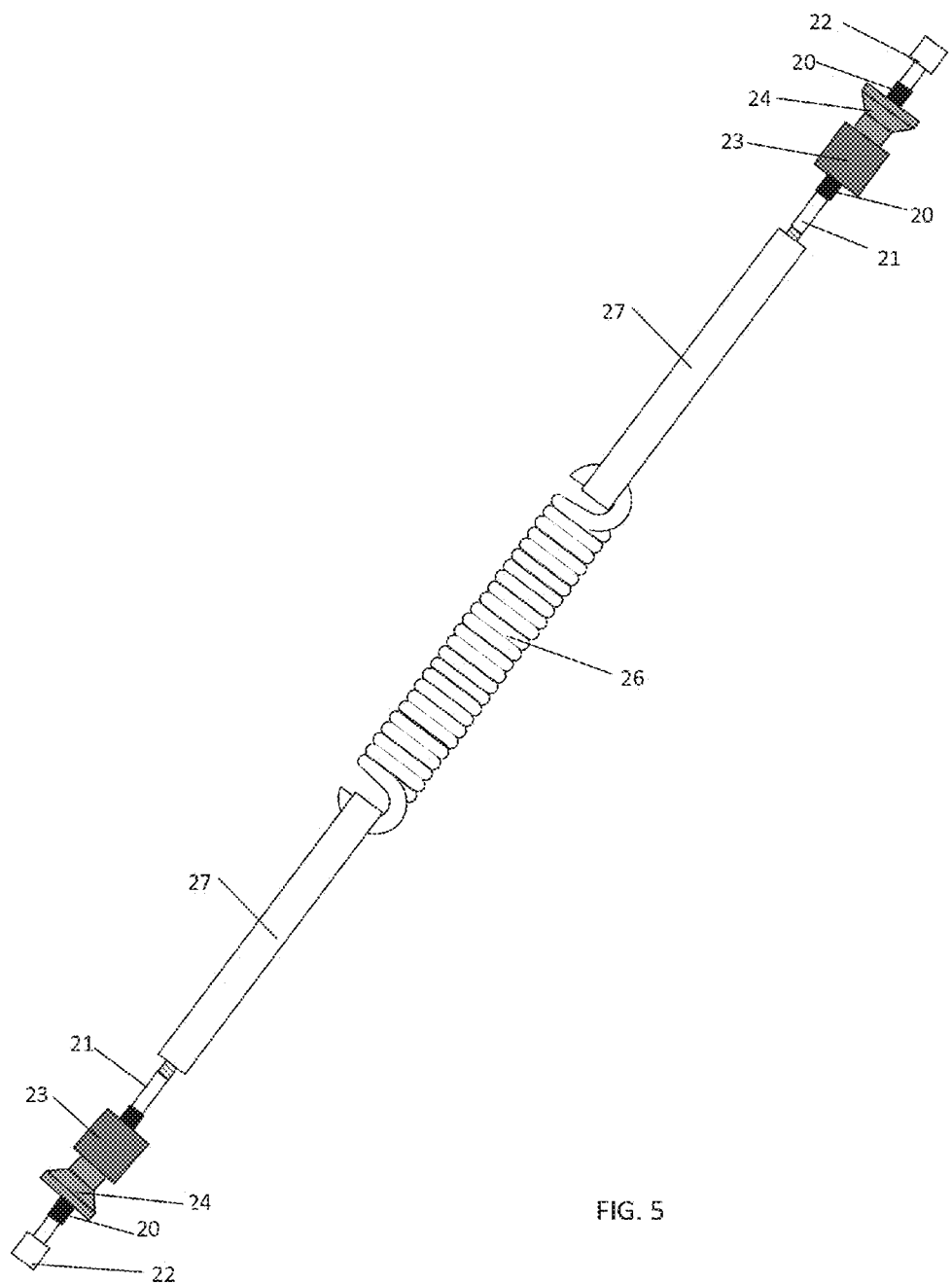
FIG. 5 provides an assembled view, according to an embodiment, of a coupling linkage used to connect actuating units and locking units of the container securing system.

With reference to FIG. 5, and according to one embodiment, the coupling linkage 25 may comprise a ball and shank 22, cable 20 and threaded terminal 21 assembly which passes through a guiding eye 24 having a guiding eye retention means 23 to secure the guiding eye 24 to an upper or lower corner fitting 10u, 10b. Furthermore, according to aspects of the embodiment, one or more linkage rods 27 may be connected by a tension mitigator 26, as illustrated in FIG. 5

FIGS. 3A-C provide an exploded, assembled, and installed view, respectively, of one embodiment of an actuating unit 100 having a compression plate 80 and a vertical return means 86. In this embodiment the actuating unit 100 is also comprised of a base plate 88 and a means of keeping the vertical return means 86 in position on the base plate 88, in this case by base plate studs 89. Furthermore the compression plate 80 depicted in this figure may have a linkage through hole (compression plate) 87 for connecting the coupling linkage 25 to the compression plate 80 of the actuating unit 100.

Figure 4A:
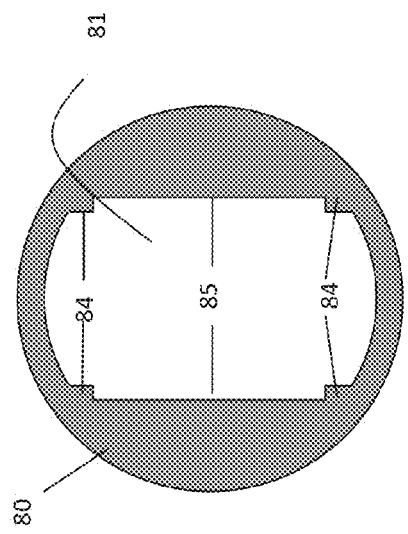
FIGS. 4A-C provide a top views of actuating unit components, including various compression plate designs and a base plate.
Figure 4C:
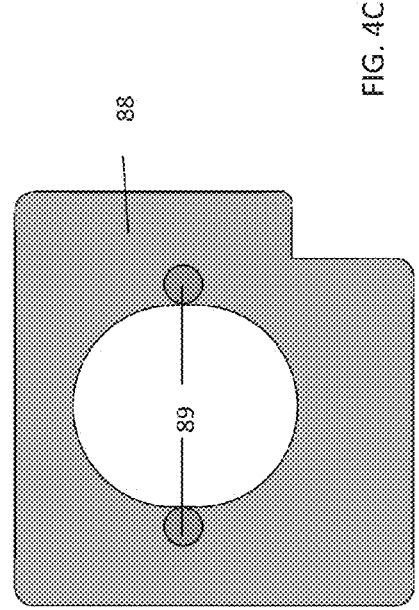
Figure 4B:
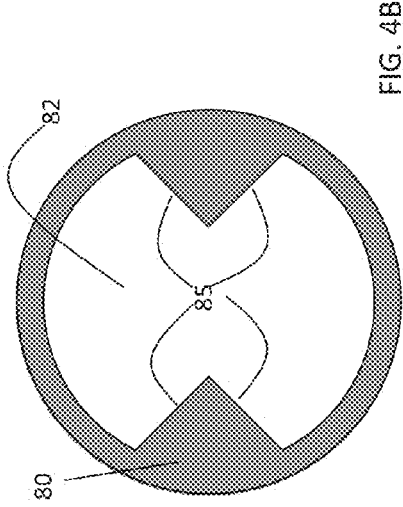

While all compression plates 80 have compression plate aperture walls 85 which are generally vertical, the shapes of the compression plate apertures themselves can vary. While the compression plate aperture 81 illustrated in FIG. 4A is of a generally rectangular shape and having tapered cone accommodators 84, the compression plate aperture 82 in FIG. 4B demonstrates a more "X"-like or butterfly shape. Other shapes may also be utilized.

Figure 6C:
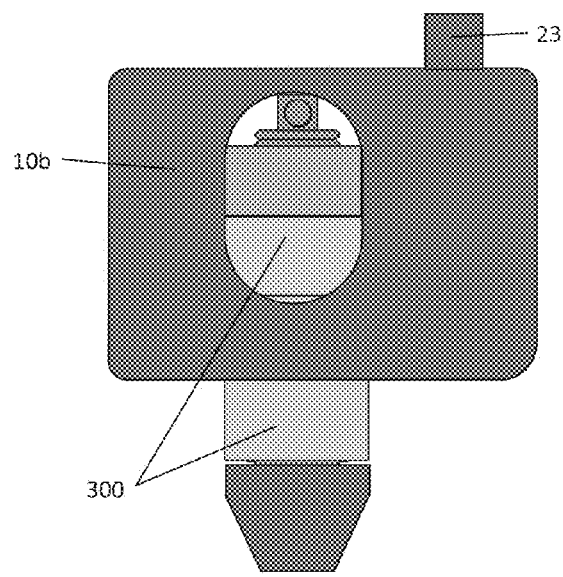

Additional details relating to the locking mechanism 300 can be seen in FIGS. 6A-C, which provide an exploded, assembled, and installed view, respectively, of one embodiment of the locking mechanism 300. In this embodiment, the locking leg 30 comprising a locking leg cone 31 and locking leg shaft 32 is inserted upward through the body 60 by passing it through the locking leg through hole (body) 65 (see FIG. 7A). Sleeve bearings 75, which assist in friction reduction, may be installed on the locking leg shaft 32 between the upper locking leg collar 34 and lower locking leg collar 33 (see FIG. 11). Torsion return means 47 having a torsional return means vertical leg 48 (see FIG. 10) is then placed on the locking leg shaft 32 with the torsional return means vertical leg 48 nested in the vertical torsion return means slot 35 on the locking leg shaft 32 and a torsional return means horizontal leg 49 (see FIG. 10) nested in the torsional return means slot on the body 60 (see FIG. 10). The locking leg shaft 32 then passes through the locking leg through hole (internal locking leg) 44 at which time the locking leg retention means 42, in this example a nut, is fastened to the locking leg shaft 32 (see FIG. 9). Alternatively, the locking leg retention means 42 can be a part of the locking leg 30 as opposed to a separate assembly piece. The lever 40 having a linkage through hole (lever) 41 (see FIG. 8) being connected to one end of the coupling linkage 25 is then inserted through the lever extension 37 at the top of the locking leg shaft 32.

Depending on preference the locking leg retention means 42 may simply be a nut as shown here, or it can alternatively be an integral part of the locking leg shaft 32. Similarly, some may prefer to not to utilize the upper and lower locking leg collar 33 and 34 respectively, and instead opt for a simple straight locking leg shaft 32.

Figure 7A:
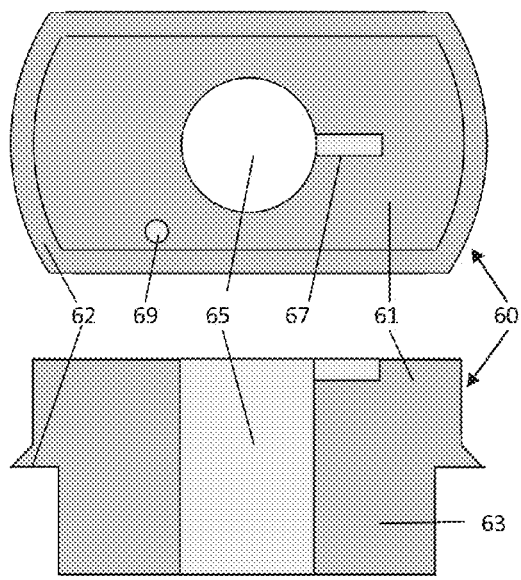
FIGS. 7A-C show top views and cross sectional front views and side views of several components comprising the locking mechanism including the body, locking leg, and internal locking leg.
Figure 7B:
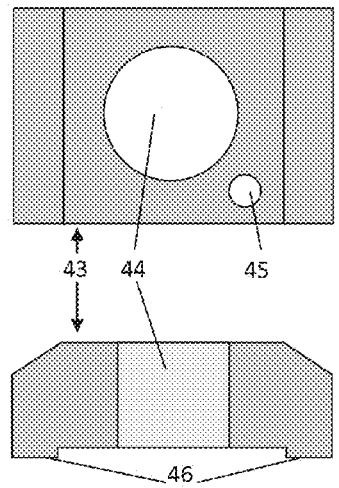
Figure 7C:
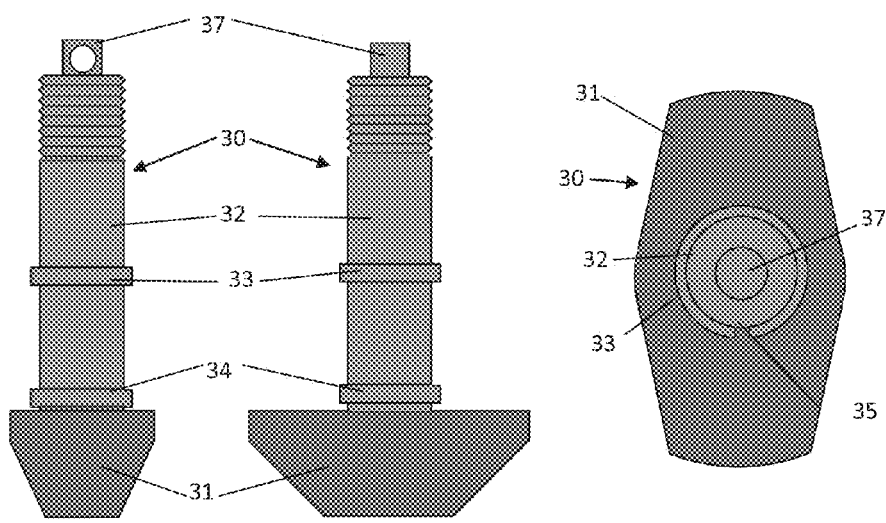

The body 60 and internal locking leg 43 is illustrated in yet more detail in FIGS. 7A-B. These figures demonstrate a bolt through hole 45 on the internal locking leg and a threaded hole 69 on the body 60 which can be utilized in conjunction with a standard bolt to connect the body 60 and internal locking leg 43 if preferred. Many other means of accomplishing this are available if preferred. A horizontal torsional return means leg slot 67 can also be seen in this cross section view of the body 60. Additionally, the clearance legs 46 on the internal locking leg 43 can be utilized in conjunction with the skirt 62 and bolt through hole 45 to tightly clamp the locking mechanism 300 in a lower corner fitting 10b.

Figure 10:
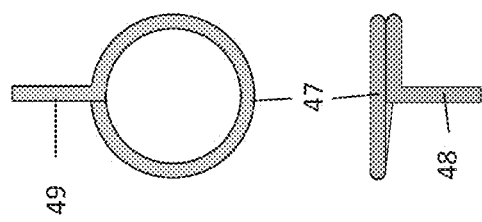
FIGS. 8-11 provide illustrations of several miscellaneous components used in one variation of a locking mechanism for a system for securing containers.
Figure 11:
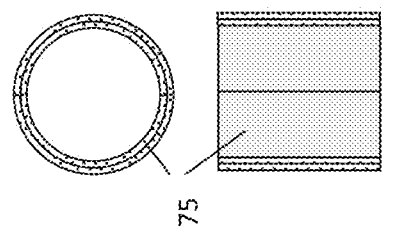
Figure 8:
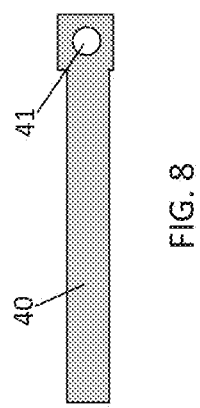
Figure 9:
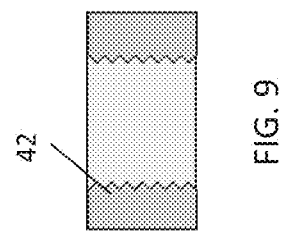

FIGS. 8-11 more clearly illustrate miscellaneous parts referred to in previous figures. FIG. 8 shows a cross sectional view of the lever 40 and the linkage through hole (lever) 41. Varying the length of lever 40 independently or in conjunction with varying circumferences of the lever extension 37 on the locking leg 30 can allow for increased tension between the actuating unit 100, coupling linkage 25, and locking mechanism 300. Increasing the length of lever 40 and/or the circumference of lever extension 37 may decrease tension within the system. FIG. 9 provides a cross sectional view of a locking leg retention means 42. FIG. 10 provides a front view and a top view of one variation of a torsional return means 47, where the torsional return means vertical leg 48 and torsional return means horizontal locking leg 49 (referred to in previous figures) can more clearly be seen. FIG. 11 provides a front and top view of sleeve bearings 75 which may be wrapped around the locking leg shaft 32 to reduce friction between the locking leg shaft 32 and the body through hole 65 in place of traditional grease, which may be problematic in cold or dirty environments.

Other characteristics of this embodiment of the body 60 include a skirt 62 to allow for increased compressive loads on the locking leg 30, body 60 and lower corner fitting 10b assembly. Alternately the skirt 62 can easily be replaced by a traditional intermediate plate common on other container securing gear if preferred; however the skirt approach has numerous advantages including improved transition of compressive forces between container at sea as well as reduced weight, material and costs. The body 60 may also have a larger upper body 61 and smaller lower body 63 to accommodate a tight fit in the elongated aperture 11 of a lower corner fitting 10b while allowing for necessary clearances in the elongated aperture 11 in upper corner fittings 10u.

While the present invention has been described with regards to particular embodiments, it is recognized that additional variations of the present invention may be devised without departing from the inventive concept.

We claim:

1. A shipping container locking system comprising:
an actuating unit housed in an interior space of an upper corner fitting of a shipping container, said actuating unit comprising a compression plate and a vertical return means, said compression plate and vertical return means configured to move in a generally vertical, rotational direction within said interior space of the upper corner fitting;
a locking mechanism at least partially housed in an interior space of a lower corner fitting of the shipping container, said locking mechanism comprising an internal locking leg and a body, each having a slot formed therethrough, said locking mechanism also comprising a locking leg shaft having a cylindrical section protruding through said slots of said internal locking leg and body and being connected to a locking leg having an elongated base;

a coupling linkage, said coupling linkage connecting said actuating unit with said locking mechanism;

a return means, said return means communicating elastically between said locking leg shaft and said internal locking leg and body, wherein a force can be applied about a central axis of the cylindrical section of said locking leg shaft;

wherein a compressive force can be applied to said actuating unit to cause a generally vertical movement of said actuating unit;

wherein a torsional force can be applied to said actuating unit to cause rotation of said actuating unit;

wherein the rotation of said actuating unit imparts a tension force on said coupling linkage;

wherein the tension force on said coupling linkage causes a movement of said coupling linkage;

wherein the movement of said coupling linkage imparts a torsional force on the locking mechanism; and wherein the torsional force on the locking mechanism causes rotation of the locking mechanism.

2. The shipping container locking system of claim 1, wherein said vertical return means protrudes in a generally perpendicular direction to said upper corner fitting, and wherein said compression plate is positioned atop said vertical return means.

3. The shipping container locking system of claim 1, wherein said compression plate rotates about a generally horizontal plane.

4. The shipping container locking system of claim 1, wherein said coupling linkage has a first end connected to said compression plate and a second end connected to said locking mechanism.

5. The shipping container locking system of claim 4, wherein said compression plate imparts a tension force on said coupling linkage.

6. The shipping container locking system of claim 1, wherein the tension force on said coupling linkage imparts a torsional force on said locking mechanism, causing said locking mechanism to unlock.

7. The shipping container locking system of claim 1, wherein said vertical return means protrudes in a generally perpendicular direction from a base plate, said base plate having an upper surface and a lower surface, said lower surface communicating in a generally horizontal plane with a floor of said upper corner fitting.

8. The shipping container locking system of claim 7, wherein said vertical return means has an upper surface and a lower surface, wherein a bottom surface of said compression plate communicates in a generally horizontal plane with said upper surface of said vertical return means, and wherein said lower surface of said vertical return means communicates in a generally horizontal plane with said base plate.

9. The shipping container locking system of claim 1, wherein said return means imparts a torsional force about the central axis of the cylindrical section of said locking leg shaft.

10. An apparatus to unlock a container twistlock, comprising:

an actuating unit housed in an interior space of an upper corner fitting of a shipping container;

said interior space comprising a floor, walls, and a ceiling;

said actuating unit comprising a compression plate and a vertical return means, said compression plate having an interior surface and a bottom surface, said compression plate configured to move up and down in a generally vertical direction and to rotate in a generally horizontal direction;

a locking mechanism housed in a lower corner fitting of the shipping container;

a coupling linkage, said coupling linkage connecting said actuating unit to said locking mechanism;

wherein a torsional force can be applied to said compression plate rotating the compression plate along a generally horizontal plane;

wherein said torsional force is converted to a tension force by said compression plate, said tension force acting on said coupling linkage to cause a movement of said coupling linkage;

and wherein the movement of said coupling linkage causes the locking mechanism to rotate and lock or unlock.

11. The apparatus to unlock a container twistlock of claim 10, wherein said coupling linkage has a first end connected to said compression plate and a second end connected to said locking mechanism.

12. The apparatus to unlock a container twistlock of claim 11, wherein said compression plate rotation imparts the tension force on said coupling linkage.

13. The apparatus to unlock a container twistlock of claim 10, wherein a tension force on said coupling linkage imparts a torsional force on said locking mechanism causing said locking mechanism to unlock.

14. The apparatus to unlock a container twistlock of claim 10, wherein said vertical return means protrudes in a generally perpendicular direction from a base plate, said base plate having an upper surface and a lower surface, said lower surface communicating in a generally horizontal plane with a floor of said upper corner fitting.

15. The apparatus to unlock a container twistlock of claim 14, wherein said vertical return means has an upper surface and a lower surface, wherein a bottom surface of said compression plate communicates in a generally horizontal plane with said upper surface of said vertical return means, and wherein said lower surface of said vertical return means communicates with said upper surface of said base plate.

16. The apparatus to unlock a container twistlock of claim 10, wherein said locking mechanism is comprised of a body, said body including a skirt configured to facilitate compressive load dispersion on said lower corner fitting.

17. The apparatus to unlock a container twistlock of claim 10, wherein said locking mechanism is comprised of a body, said body including an upper body and a lower body, said upper body being generally larger in length and width than said lower body.

18. The apparatus to unlock a container twistlock of claim 10, wherein said locking mechanism is comprised of friction reducing sleeve bearings.

19. The apparatus to unlock a container twistlock of claim 10, wherein said locking mechanism is shaped to provide a tight fit with a lower container corner casting with clearances in upper container corner fittings.

20. The apparatus to unlock a container twistlock of claim 10, wherein components of said actuating unit and said locking mechanism vary in size to impart varying degrees of rotation in relation to each other.

21. The apparatus to unlock a container twistlock of claim 10, wherein said compression plate comprises an aperture that is one of generally rectangular in shape and generally X-shaped.

* * * * *